United States Patent
Sakuragi

(10) Patent No.: US 9,667,892 B2
(45) Date of Patent: May 30, 2017

(54) IMAGE SENSOR, IMAGE SENSING DEVICE, CAMERA, AND METHOD OF DRIVING IMAGE SENSING DEVICE

(71) Applicant: CANON KABUSHIKI KAISHA, Tokyo (JP)

(72) Inventor: Takamasa Sakuragi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 14/506,767

(22) Filed: Oct. 6, 2014

(65) Prior Publication Data
US 2015/0109505 A1   Apr. 23, 2015

(30) Foreign Application Priority Data
Oct. 18, 2013  (JP) ................................ 2013-217861

(51) Int. Cl.
| | |
|---|---|
| *H04N 5/357* | (2011.01) |
| *H04N 5/369* | (2011.01) |
| *H04N 5/378* | (2011.01) |
| *H04N 5/3745* | (2011.01) |
| *H04N 5/374* | (2011.01) |

(52) U.S. Cl.
CPC ......... *H04N 5/3575* (2013.01); *H04N 5/3698* (2013.01); *H04N 5/378* (2013.01); *H04N 5/3742* (2013.01); *H04N 5/3745* (2013.01)

(58) Field of Classification Search
CPC ........................... H04N 5/3375; H04N 5/3698
See application file for complete search history.

(56) References Cited

U.S. PATENT DOCUMENTS

| | | | |
|---|---|---|---|
| 7,023,482 B2 | 4/2006 | Sakuragi | |
| 8,278,613 B2 | 10/2012 | Okita et al. | |
| 8,531,591 B2 | 9/2013 | Okamoto et al. | |
| 8,638,384 B2 | 1/2014 | Sakuragi | |
| 8,884,864 B2 | 11/2014 | Sakuragi | |
| 2009/0244335 A1* | 10/2009 | Chou | H04N 5/2173 348/294 |
| 2010/0053402 A1* | 3/2010 | Itakura | H04N 5/3454 348/311 |

(Continued)

FOREIGN PATENT DOCUMENTS

| | | |
|---|---|---|
| JP | H03-018184 A | 1/1991 |
| JP | 2003-051989 A | 2/2003 |

(Continued)

*Primary Examiner* — Christopher K Peterson
(74) *Attorney, Agent, or Firm* — Fitzpatrick, Cella, Harper & Scinto

(57) ABSTRACT

An image sensor includes a semiconductor chip and a package covering the semiconductor chip. The semiconductor chip includes a pixel portion including a plurality of pixels, a memory, a readout unit configured to write, in the memory, a signal corresponding to a signal from the pixel portion, an output unit configured to output an image signal corresponding to the signal written in the memory, a control unit configured to output a control signal to an output pin of the package via an output pad of the semiconductor chip, and a pad to which a power supply voltage is supplied from outside the semiconductor chip. The control signal is a signal indicating a period during which the signal corresponding to the signal from the pixel portion is written in the memory of the readout unit.

11 Claims, 10 Drawing Sheets

(56) References Cited

U.S. PATENT DOCUMENTS

| | | | | |
|---|---|---|---|---|
| 2010/0238336 A1* | 9/2010 | Okamoto | ............... | H04N 5/357 348/308 |
| 2011/0147601 A1* | 6/2011 | Niekawa | ............. | A61B 6/4233 250/370.09 |
| 2012/0043454 A1* | 2/2012 | Sakuragi | ................... | G01J 1/46 250/206 |
| 2015/0062393 A1* | 3/2015 | Komaba | ................ | H04N 5/374 348/300 |

FOREIGN PATENT DOCUMENTS

| | | | | | |
|---|---|---|---|---|---|
| JP | 2010-273158 A | 12/2010 | | | |
| JP | WO2013099266 | * | 4/2013 | ........... | H04N 5/3698 |

* cited by examiner

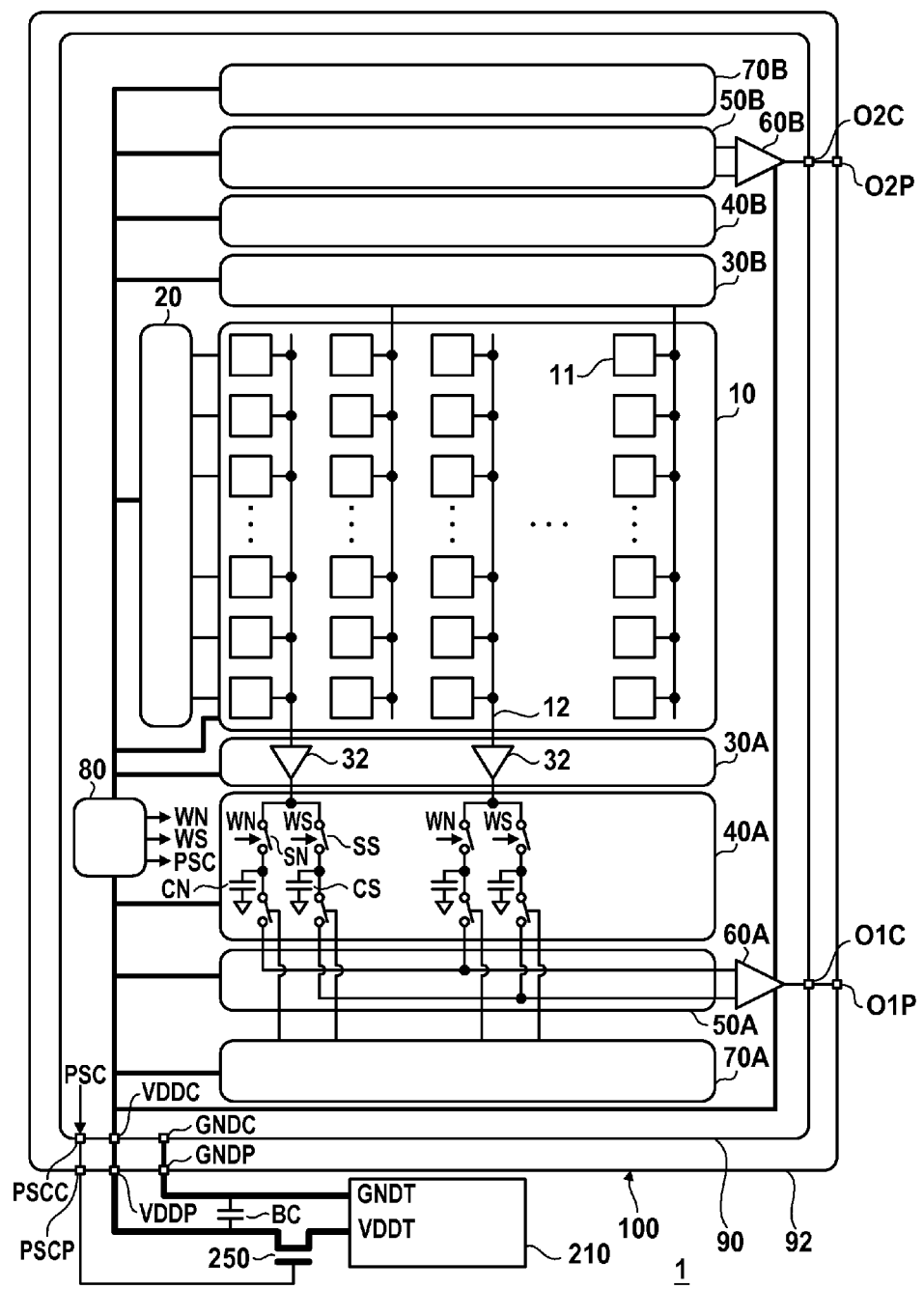
F I G. 3

F I G. 5
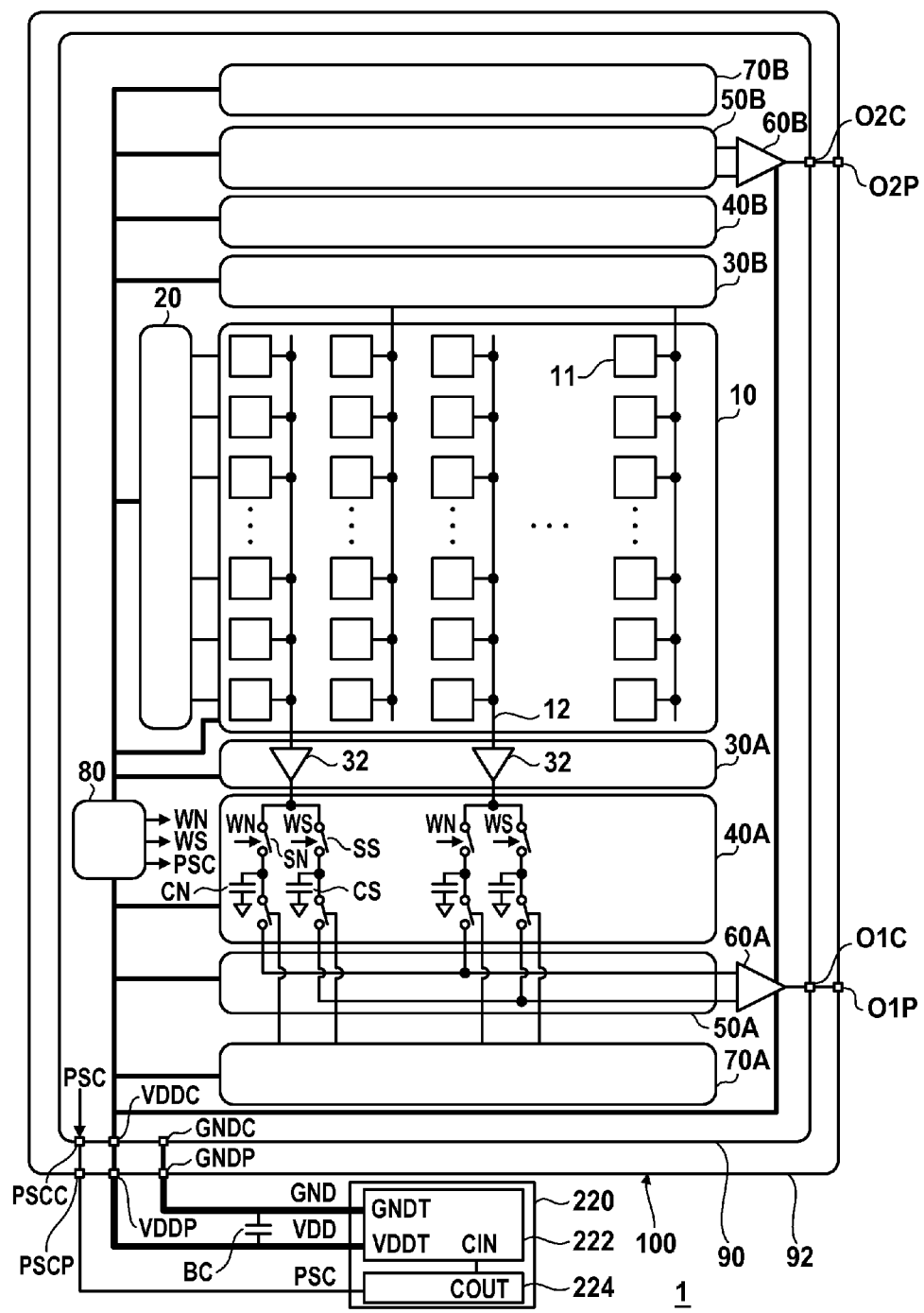

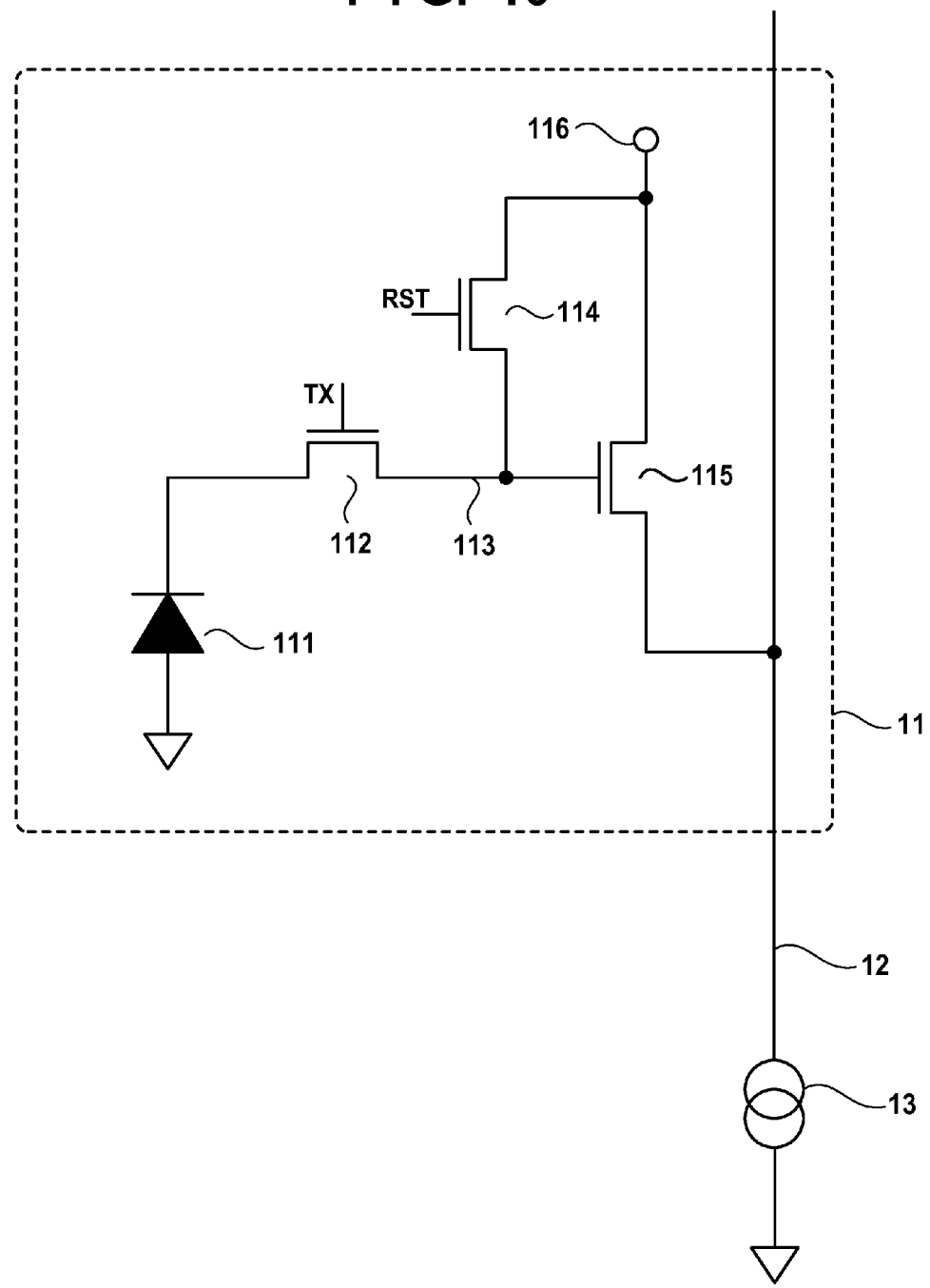
F I G. 10

IMAGE SENSOR, IMAGE SENSING DEVICE, CAMERA, AND METHOD OF DRIVING IMAGE SENSING DEVICE

BACKGROUND OF THE INVENTION

Field of the Invention

The present invention relates to an image sensor, an image sensing device, a camera, and a method of driving the image sensing device.

Description of the Related Art

An image sensor such as a CMOS sensor or CCD sensor operates when a power supply circuit supplies a power supply voltage to the power supply terminal of the sensor. The power supply voltage output from a power supply contains random noise. This random noise propagates to pixels in the image sensor or a readout unit, which reads out signals from pixels, via a power supply line. For this reason, the random noise contained in the power supply voltage supplied from the power supply circuit can decrease the S/N ratio of an image signal output from the image sensor.

Some image sensors are designed to output an image signal corresponding to the difference between a signal corresponding to a reset level from a pixel and a signal corresponding to an optical signal level from the pixel, that is, to perform CDS (Correlated Double Sampling) (see Japanese Patent Laid-Open No. 2003-51989). Although such an image sensor can obtain an image signal having a high S/N ratio, there is a time difference between the timing of sampling a signal corresponding to a reset level and the timing of sampling a signal corresponding to an optical signal level. For this reason, even an image sensor designed to perform CDS has its own limit when removing the influence of random noise from the power supply circuit.

SUMMARY OF THE INVENTION

The present invention provides a technique advantageous in reducing the influence of noise generated by a power supply circuit.

One of aspects of the present invention provides an image sensor comprising a semiconductor chip and a package covering the semiconductor chip, the semiconductor chip comprising a pixel portion including a plurality of pixels, a memory, a readout unit configured to write, in the memory, a signal corresponding to a signal from the pixel portion, an output unit configured to output an image signal corresponding to the signal written in the memory, a control unit configured to output a control signal to an output pin of the package via an output pad of the semiconductor chip, and a pad to which a power supply voltage is supplied from outside the semiconductor chip, wherein the control signal is a signal indicating a period during which the signal corresponding to the signal from the pixel portion is written in the memory of the readout unit.

Further features of the present invention will become apparent from the following description of exemplary embodiments with reference to the attached drawings.

BRIEF DESCRIPTION OF THE DRAWINGS

FIG. 3 is a circuit diagram showing the arrangement of an image sensor and an image sensing device according to the second embodiment of the present invention;

FIG. 5 is a circuit diagram showing the arrangement of an image sensor and an image sensing device according to the third embodiment of the present invention;

FIG. 10 is a circuit diagram showing an example of the arrangement of a pixel;

DESCRIPTION OF THE EMBODIMENTS

Figure 9:
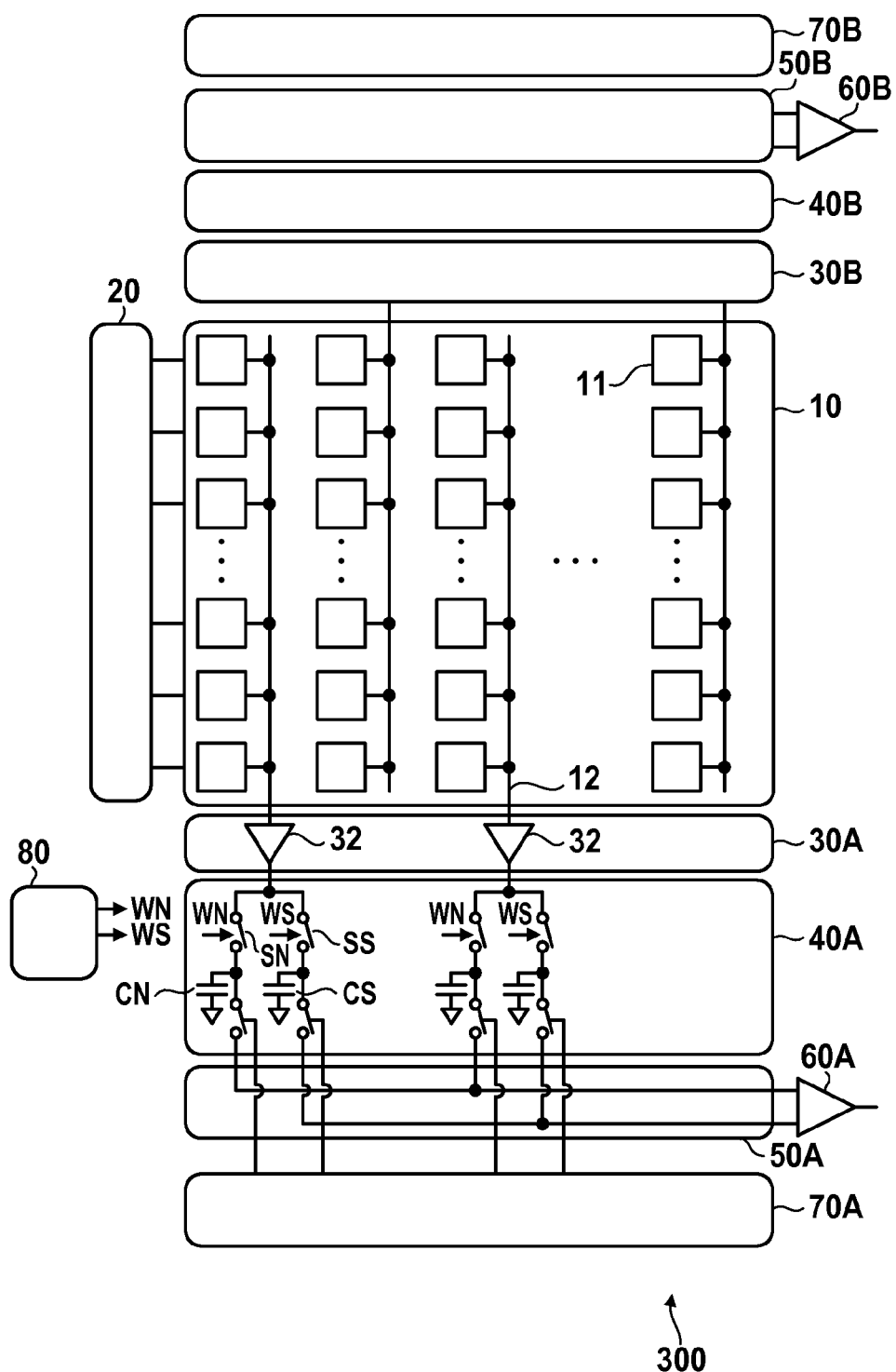
FIG. 9 is a circuit diagram for explaining a problem in the present invention.

Noise suppression and its problem in an image sensor, especially an image sensor having a CDS function, will be described first with reference to FIGS. 9 to 12. FIG. 9 exemplarily shows the arrangement of an image sensor 300. The image sensor 300 includes a pixel portion 10, a row selection unit 20, readout units 30A and 30B, memories 40A and 40B, horizontal signal line sections 50A and 50B, output units 60A and 60B, column selection units 70A and 70B, and a control unit 80. The pixel portion 10 is constituted by a plurality of pixels 11 arranged two-dimensionally to form a plurality of rows and a plurality of columns. The row selection unit 20 selects a row in the pixel portion 10. The readout units 30A and 30B write signals corresponding to signals from the pixel portion 10 (more specifically, the pixels 11 on the row selected by the row selection unit 20) in the memories 40A and 40B. More specifically, the readout units 30A and 30B write the signals obtained by amplifying signals from the pixel portion 10 in the memories 40A and 40B.

The memories 40A and 40B respectively include a plurality of memory devices which hold signals (signals corresponding to signals from the pixels 11) read out from the pixels 11 of the pixel portion 10 by the readout units 30A and 30B. The horizontal signal line sections 50A and 50B transmit, to the output units 60A and 60B, the signals held in memory devices, of the plurality of memory devices of the memories 40A and 40B, which are selected by the column selection units 70A and 70B. The output units 60A and 60B amplify the signals transmitted via the horizontal signal line sections 50A and 50B and output the amplified signals as image signals.

The readout unit 30A, the memory 40A, the horizontal signal line section 50A, the output unit 60A, and the column selection unit 70A are arranged on one side of the pixel portion 10. This arrangement is configured to output signals corresponding to the signals from the pixels 11 on the odd-numbered columns. The readout unit 30B, the memory 40B, the horizontal signal line section 50B, the output unit 60B, and the column selection unit 70B are arranged on the other side of the pixel portion 10. This arrangement is configured to output signals corresponding to signals from the pixels 11 on the even-numbered columns. The readout unit 30B, the memory 40B, the horizontal signal line section 50B, the output unit 60B, and the column selection unit 70B respectively have the same arrangements as those of the readout unit 30A, the memory 40A, the horizontal signal line section 50A, the output unit 60A, and the column selection unit 70A.

The memories 40A and 40B include a plurality of memory devices CN and a plurality of memory devices CS. The readout unit 30A writes signals corresponding to the reset level from the pixel portion (more specifically, the pixels 11 on the row selected by the row selection unit 20) in the memory devices CN of the memory 40A. The readout unit 30A writes signals corresponding to the optical signal level from the pixel portion 10 (more specifically, the pixels 11 on the row selected by the row selection unit 20) in the memory devices CS of the memory 40B. Likewise, the readout unit 30B writes signals corresponding to the reset level and signals corresponding to the optical signal level in the memory devices CN and CS of the memory 40B.

In this case, the signals corresponding to the reset level are written in the memory devices CN by turning on the write switches SN using the write signals WN. The signals corresponding to the optical signal level are written in the memory devices CS by turning on the write switches SS using the write signals WS. The control unit 80 controls the write signals WN and WS.

FIG. 10 shows an example of the arrangement of the pixel 11. The pixel 11 can include, for example, a photoelectric converter (for example, a photodiode) 111, a transfer transistor 112, a floating diffusion node 113, a reset transistor 114, and an amplification transistor 115. The photoelectric converter 111 generates and accumulates electric charges corresponding to an optical signal striking the converter. The transfer transistor 112 transfers the electric charges from the photoelectric converter 111 to the floating diffusion node 113 when a transfer signal TX driven by the row selection unit 20 is at an active level. The reset transistor 114 resets the potential of the floating diffusion node 113 when a reset signal RST driven by the row selection unit 20 is at an active level. The amplification transistor 115 forms a source-follower circuit, together with the current source 13 connected to the column signal line 12, and outputs a signal corresponding to the potential of the floating diffusion node 113 to the column signal line 12.

The reset transistor 114 is arranged between a power supply terminal 116 and the floating diffusion node 113. The amplification transistor 115 is arranged between the power supply terminal 116 and the column signal line 12. Note that different power supply terminals may supply different voltages to the reset transistor 114 and the amplification transistor 115, respectively.

Figure 11:
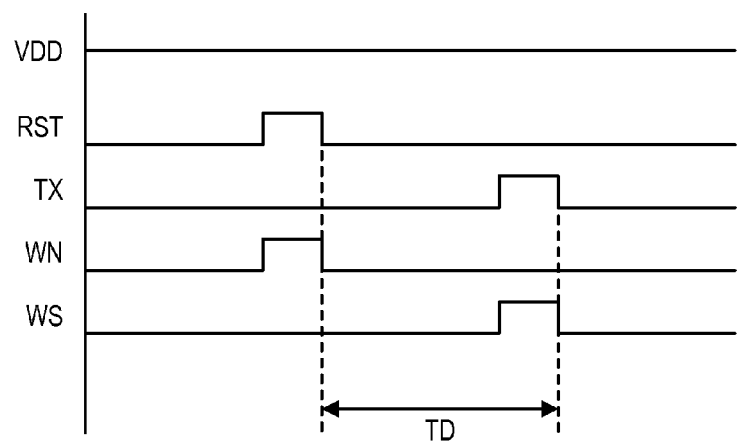
FIG. 11 is a timing chart for explaining a problem in the present invention.

FIG. 11 exemplarily shows how signals are read out from the pixels 11 by the readout unit 30A (30B) and signals are written in the memory devices CN and CS of the memory 40A (40B). When the reset signal RST is at an active level, the reset transistor 114 resets the potential of the floating diffusion node 113 to output the reset level to the column signal line 12. At this time, the readout unit 30A (30B) outputs a signal (to be referred to as the reset signal hereinafter) corresponding to the reset level output to the column signal line 12. The reset signal is written in the memory device CN when the write signal WN is set at an active level.

When the transfer signal TX is set at an active level, the transfer transistor 112 transfers the electric charges accumulated in the photoelectric converter 111 to the floating diffusion node 113. This changes the potential of the floating diffusion node 113. At this time, the optical signal level is output to the column signal line 12, and the readout unit 30A (30B) outputs a signal (to be referred to as the optical signal) corresponding to the optical signal level output to the column signal line 12. The optical signal is written in the memory device CS when the write signal WS is set at an active level.

The reset signal and the optical signal respectively written in the memory devices CN and CS are output to the horizontal signal line section 50A (50B) when the column selection unit 70A (70B) selects the memory devices CN and CS. The output unit 60A (60B) generates an image signal by performing differential amplification (that is, CDS) of the reset signal and the optical signal output to the horizontal signal line section 50A (50B), and outputs the image signal.

When noise such as random noise generated in the power supply circuit propagates to the image sensor 300, the noise propagates to the power supply terminal 116 of the pixel 11. The noise propagates to the floating diffusion node 113 via parasitic capacitances between the power supply terminal 116 and the floating diffusion node 113. Furthermore, the noise which has propagated to the floating diffusion node 113 propagates to the memory devices CN and CS via the column signal line 12 and the readout unit 30A (30B).

Such noise can be suppressed by the CDS mentioned above. As exemplarily shown in FIG. 11, however, there is a time difference TD between the timing of writing a signal in the memory device CN and the timing of writing a signal in the memory device CS. For this reason, noise written in the memory devices CN and CS differs in level. This imposes a limitation on noise suppression ability by CDS.

Figure 12:
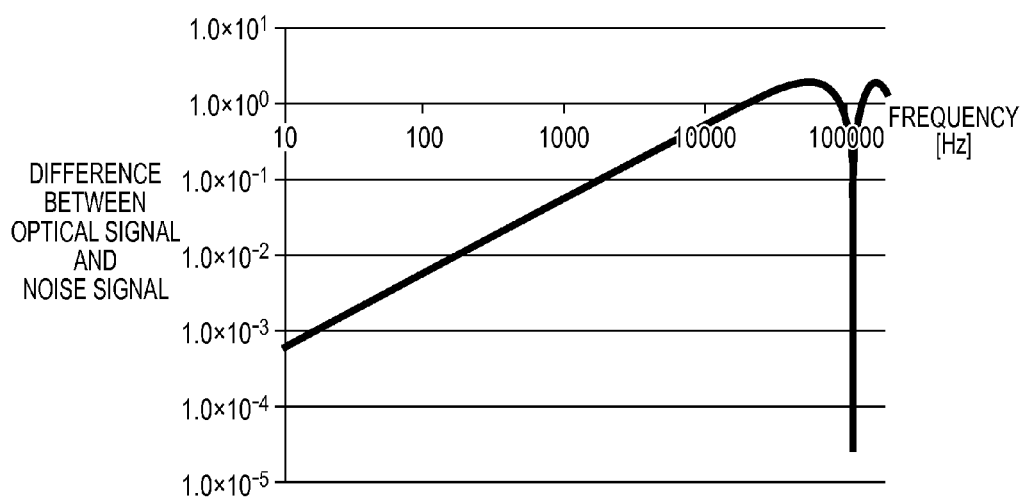
FIG. 12 is a graph exemplifying the noise suppression performance of CDS.

The noise suppression effect obtained by CDS decreases as the frequency of noise increases. FIG. 12 shows the frequency dependence of the difference between a noise signal and an optical signal when the time difference TD is 8.5 μs. The difference is $1.0 \times 10^{-3}$ or less when the frequency is 10 Hz, whereas the difference increases to near 0.9 when the frequency is 10 kHz. This indicates that noise on a 10-kHz signal is hardly suppressed.

The noise suppression effect obtained by CDS has been described. When no CDS is performed, the influence of noise from the power supply circuit becomes larger.

An embodiment advantageous in reducing the influence of noise generated by the power supply circuit will be described below.

Figure 1:
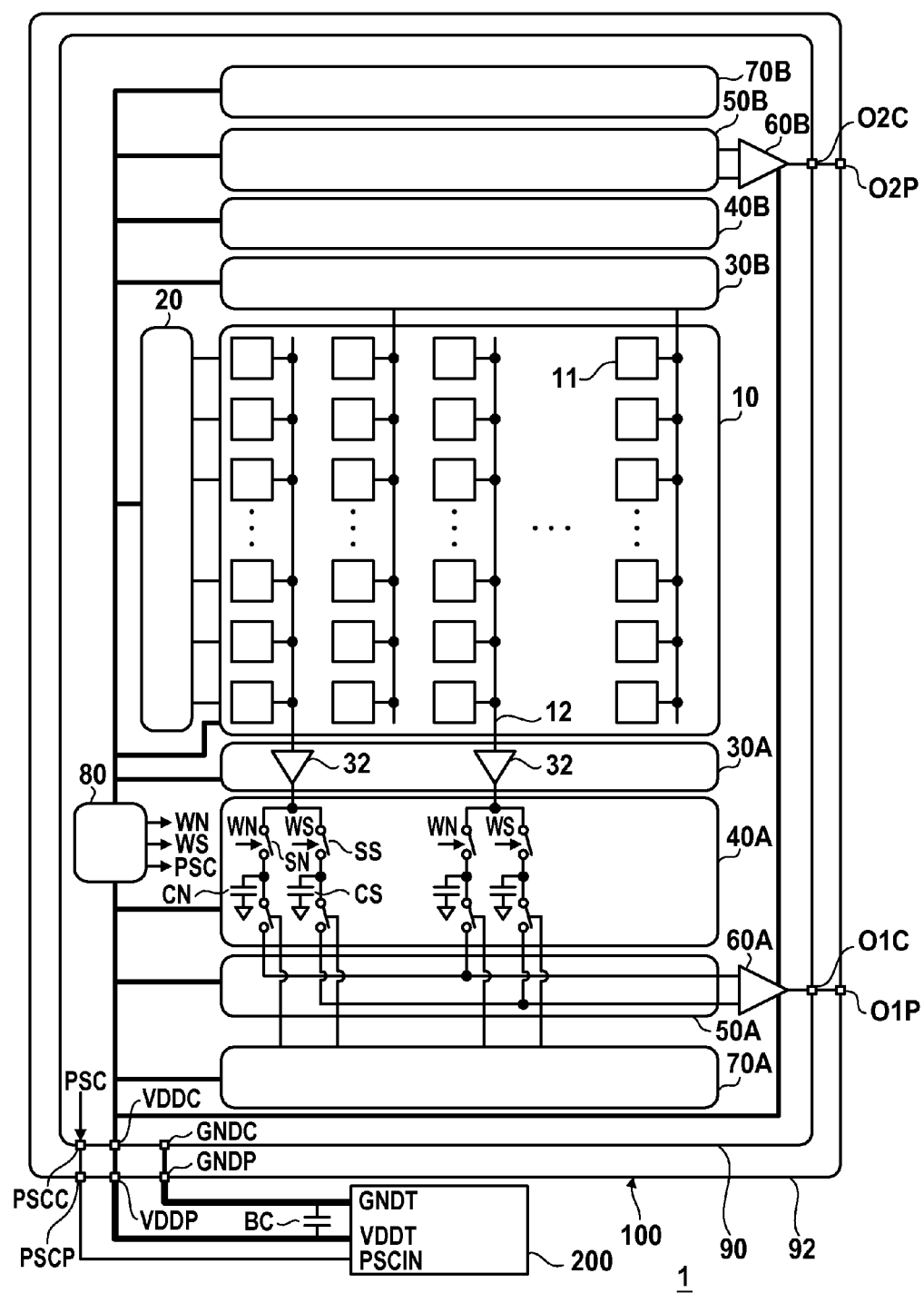
FIG. 1 is a circuit diagram showing the arrangement of an image sensor and an image sensing device according to the first embodiment of the present invention.

FIG. 1 shows the arrangement of an image sensor 100 and an image sensing device 1 according to the first embodiment of the present invention. The same reference numerals denote the same elements as those of the image sensor 300 shown in FIG. 9, and a description of them will be omitted. The image sensing device 1 includes the image sensor 100 and a power supply circuit 200. The image sensor 100 includes a semiconductor chip 90 and a package 92 covering the semiconductor chip 90. The semiconductor chip 90 includes a pixel portion 10, a row selection unit 20, readout units 30A and 30B, memories 40A and 40B, horizontal signal line sections 50A and 50B, output units 60A and 60B, column selection units 70A and 70B, and a control unit 80. The semiconductor chip 90 has a plurality of pads including output pads O1C, O2C, and PSCC, a power supply pad VDDC, and a ground pad GNDC. The package 92 includes a plurality of pins including output pins O1P, O2P, and PSCP, a power supply pin VDDP, and a ground pin GNDP.

The pads of the semiconductor chip 90 are connected to the pins of the package 92 via, for example, bonding wires and lead frames. The power supply pin VDDP of the image sensor 100 is connected to the power supply terminal VDDT of the power supply circuit 200 via a power supply line. In addition, the ground pin GNDP is connected to a ground terminal GNDT of the power supply circuit 200 via a ground line. A bypass capacitor BC is connected between the power supply pin VDDP of the image sensor 100 and the ground pin GNDP. The bypass capacitor BC functions as a power supply voltage holding unit.

The control unit 80 outputs a control signal PSC indicating a period during which noise should be suppressed to the output pin PSCP of the package 92 via the output pad PSCC of the semiconductor chip 90. In this case, the period during which noise should be suppressed includes periods during which the readout units 30A and 30B write signals corresponding to the signals from the pixel portion 10 in the memories 40A and 40B, that is, periods during which the write signals WN and WS are at an active level. The control signal PSC is connected to an input terminal PSCIN of the power supply circuit 200.

Figure 2:
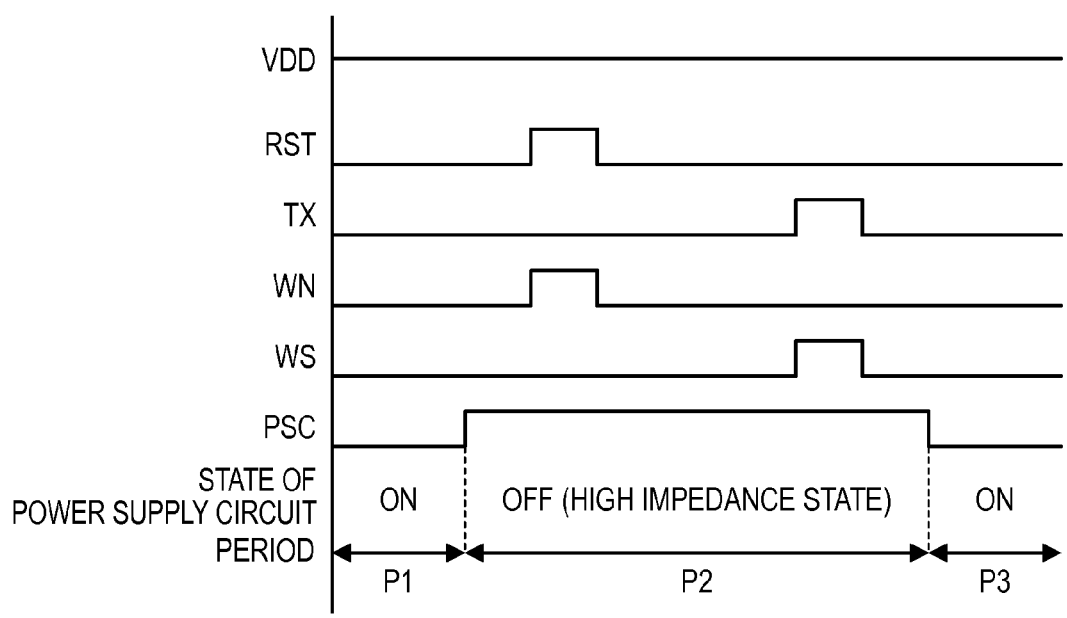
FIG. 2 is a timing chart showing the operations of the image sensor and the image sensing device according to the first embodiment of the present invention.

As exemplarily shown in FIG. 2, when the control signal PSC is at an inactive level, the power supply circuit 200 outputs a power supply voltage VDD between a power supply terminal VDDT and a ground terminal GNDT. When the control signal PSC is at an active level, the power supply circuit 200 sets a high impedance state between the power supply terminal VDDT and the ground terminal GNDT.

That is, in the first embodiment, when the power supply circuit 200 is in the OFF state and a high impedance state is set between the power supply terminal VDDT and the ground terminal GNDT, signals are written in the memory devices CN and CS of the memories 40A and 40B. When the power supply circuit 200 is in the OFF state, the power supply circuit 200 generates neither the power supply voltage VDD nor noise. In the image sensor 100, therefore, while no noise propagates from the power supply circuit 200, signals are written in the memory devices CN and CS of the memories 40A and 40B. In this case, when the power supply circuit 200 is in the OFF state, the voltage between the power supply terminal VDDT and the ground terminal GNDT is maintained at the power supply voltage VDD by the parasitic capacitance between the terminals or the bypass capacitor BC. Therefore, even when the power supply circuit 200 is in the OFF state, the image sensor 100 normally operates.

A period during which the control signal PSC is set at active level is normally 10 μs at most. In this period, a drop in the power supply voltage VDD at the power supply terminal VDDT is small. This is because the power supply line in the pixel portion 10, which is used to supply a power supply voltage to the power supply terminal 116 of the pixel portion 10, alone can be accompanied by a parasitic capacitance of about 10 nF to 100 nF originating from p-n junctions formed between the power supply line and the ground line in the chip 90. In addition, a parasitic capacitance also exists between the power supply terminal VDDT and the ground terminal GNDT, and the bypass capacitor BC is normally connected between them.

The timing when the control unit 80 shifts the control signal PSC to the active level is determined in consideration of the delay time from the instant the control signal PSC shifts to the active level to the instant the power supply circuit 200 shifts to the OFF state. Note that the control unit 80 which controls the control signal PSC may be provided outside the semiconductor chip 90. The control unit 80 outputs the control signal PSC, which indicates a period during which noise should be suppressed, to the output pin PSCP of the package 92 via the output pad PSCC of the semiconductor chip 90. The power supply circuit 200 can be set in the OFF state at a proper timing even when the image sensor 100 operates in various modes such as a still image sensing mode, a moving image sensing mode, and a long exposure image sensing mode.

An image sensor 100 and an image sensing device 1 according to the second embodiment of the present invention will be described with reference to FIGS. 3 and 4. The same reference numerals denote the same elements as those of the image sensing device 1 shown in FIG. 1, and a description of them will be omitted. In the second embodiment, the power supply circuit 200 in the first embodiment is replaced by a power supply circuit 210. The power supply circuit 210 does not include the input terminal PSCIN which receives the control signal PSC. Noise propagating from the power supply circuit 210 to the image sensor 100 is suppressed by turning off a switch 250 arranged between a power supply terminal VDDT of the power supply circuit 210 and a power supply pin VDDP of the image sensor 100. The control signal PSC controls the switch 250.

A control unit 80 outputs the control signal PSC, which indicates a period during which noise should be suppressed, to an output pin PSCP of a package 92 via an output pad PSCC of a semiconductor chip 90. In this case, the period during which noise should be suppressed includes periods during which readout units 30A and 30B write signals corresponding to signals from a pixel portion 10 in memories 40A and 40B, that is, periods during which write signals WN and WS are at an active level. Note that the active level of the control signal PSC in the second embodiment is opposite to that of the control signal PSC in the first embodiment. However, this setting is made for the sake of design and is not essential.

Figure 4:
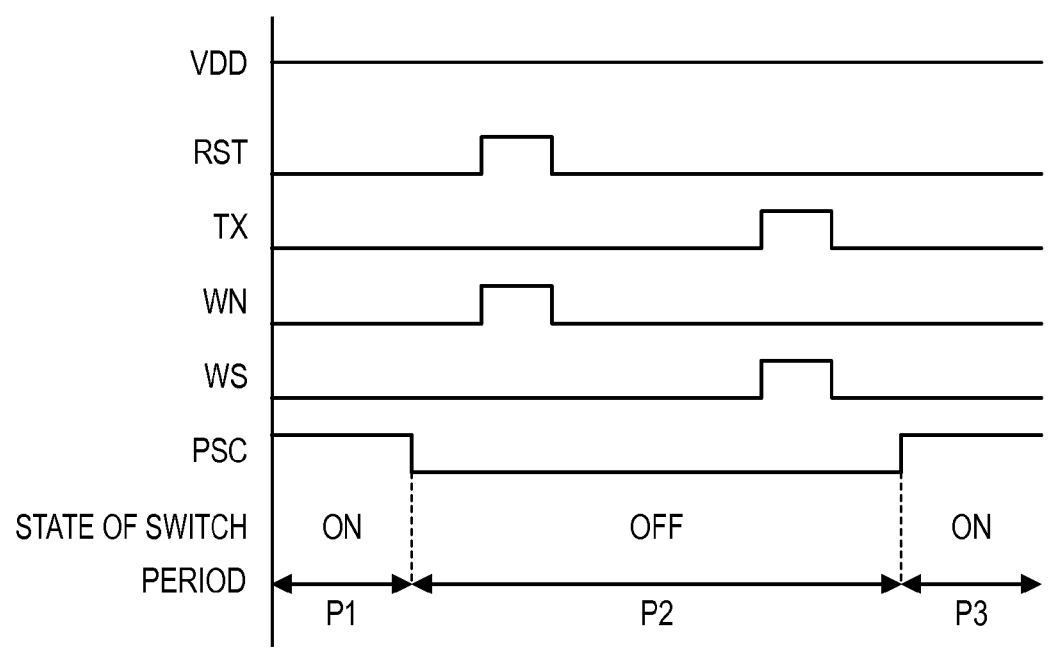
FIG. 4 is a timing chart showing the operations of the image sensor and the image sensing device according to the second embodiment of the present invention.

As exemplarily shown in FIG. 4, the switch 250 is set in the OFF state in a period during which noise should be suppressed, that is, a period during which the control signal PSC is at the active level. This prevents noise from propagating from the power supply circuit 210 to the image sensor 100 via the power supply line. That is, in the second embodiment, when the switch 250 arranged between the power supply terminal VDDT of the power supply circuit 210 and the power supply pin VDDP of the image sensor 100 is set in the OFF state, signals are written in the memory devices CN and CS of the memories 40A and 40B.

The image sensor 100 and the image sensing device 1 according to the third embodiment of the present invention will be described with reference to FIGS. 5 to 7. The same reference numerals denote the same elements as those of the image sensing device 1 shown in FIG. 1, and a description of them will be omitted. In the third embodiment, the power supply circuit 200 according to the first embodiment is replaced by a power supply circuit 220. Note that the active level of a control signal PSC in the third embodiment is opposite to that of the control signal PSC in the first embodiment. However, this setting is made for the sake of design and is not essential.

Figure 6:
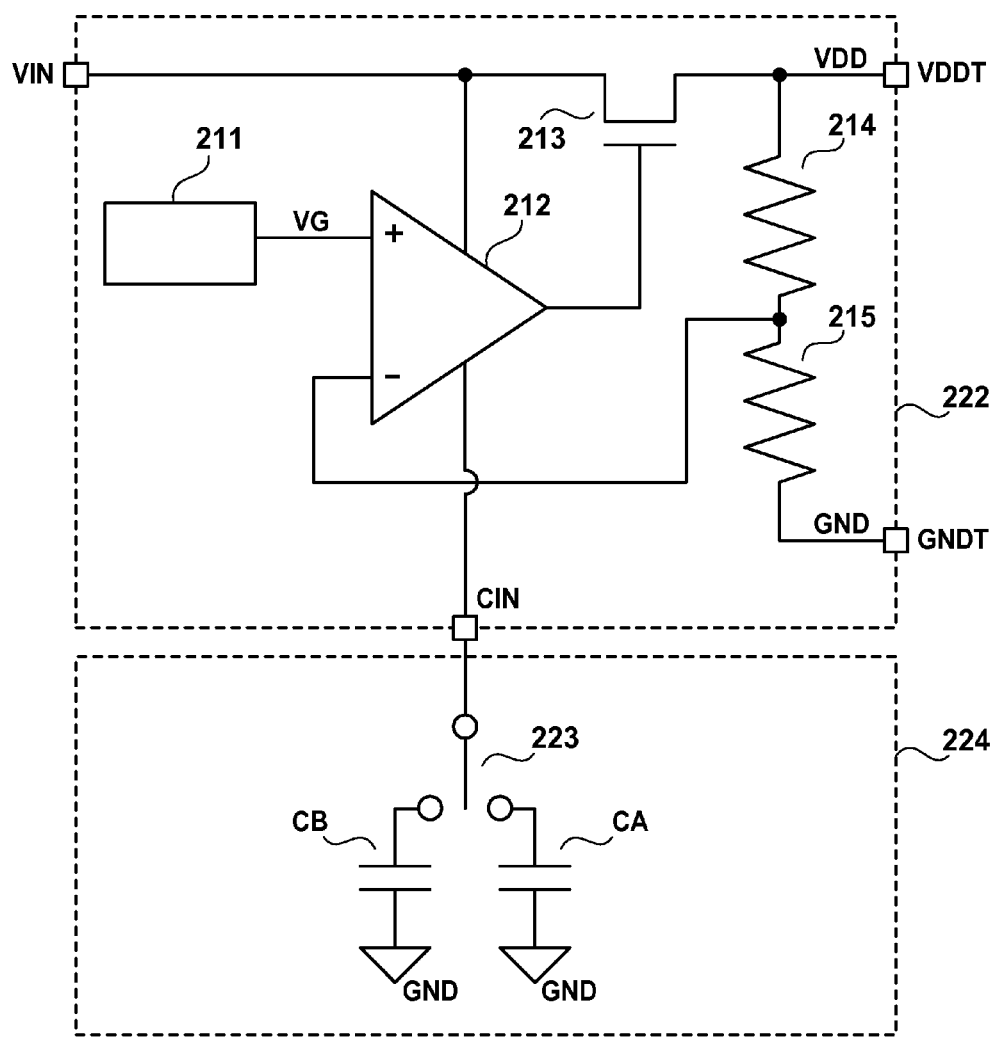
FIG. 6 is a circuit diagram showing the arrangement of the power supply circuit of the image sensing device according to the third embodiment of the present invention.
Figure 7:
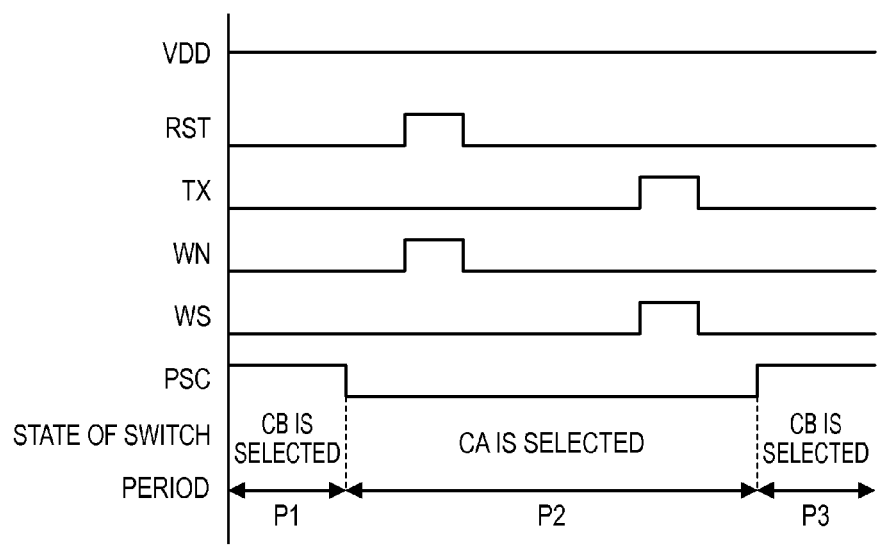
FIG. 7 is a timing chart showing the operations of the image sensor and the image sensing device according to the third embodiment of the present invention.

As shown in FIG. 6, the power supply circuit 220 includes a voltage supply circuit 222 which supplies a voltage to an image sensor 100 and a phase compensation unit 224. The voltage supply circuit 222 includes a differential amplifier circuit 212 having a phase compensation terminal CIN. The phase compensation unit 224 includes phase compensation capacitors CA and CB selectively connected to the phase compensation terminal CIN. As the control signal PSC shifts from a state (inactive period) which does not indicate a period during which noise should be suppressed to a state which indicates a period (active period) during which noise should be suppressed, the value of the phase compensation capacitor connected to the phase compensation terminal CIN increases. Consider, for example, a case in which the capacitance value of the phase compensation capacitor CA is larger than that of the phase compensation capacitor CB. In this case, as the control signal PSC shifts from a state which does not indicate a period during which noise should be suppressed to a state which indicates a period during which noise should be suppressed, the phase compensation capacitor connected to the phase compensation terminal CIN is changed from the phase compensation capacitor CB to the phase compensation capacitor CA. Such a change of phase compensation capacitors can be made by controlling a switch 223 using the control signal PSC.

As exemplarily shown in FIG. 6, the voltage supply circuit 222 can be formed from a series regulator. The voltage supplied to an input terminal VIN of the voltage supply circuit 222 is supplied to the power supply terminal of the differential amplifier circuit 212. A reference voltage generation circuit 211 supplies a reference voltage to the non-inverting input terminal of the differential amplifier circuit 212. The input terminal VIN of the voltage supply circuit 222 is connected to a power supply terminal VDDT as the output terminal of the voltage supply circuit 222 via a transistor 213 which is controlled by an output from the differential amplifier circuit 212. The power supply terminal VDDT is connected to a ground terminal GNDT via resistors 214 and 215 which are connected in series. The resistors 214 and 215 divide the power supply voltage VDD output to the power supply terminal VDDT. The divided voltage is supplied to the inverting input terminal of the differential amplifier circuit 212. The amount of phase rotation of the differential amplifier circuit 212 is decided by the phase compensation capacitors CA and CB selectively connected to the phase compensation terminal CIN of the differential amplifier circuit 212 (voltage supply circuit 222).

When the reference voltage generation circuit 211 applies a reference voltage VG to the non-inverting input terminal of the differential amplifier circuit 212, the differential amplifier circuit 212 controls the gate voltage of a transistor 213 so as to make the voltage at the inverting input terminal equal to the reference voltage VG. Therefore, a power supply voltage VDD appearing at the power supply terminal VDDT is the value decided by the following equation, where R1 is the resistance value of the resistor 214 and R2 is the resistance value of the resistor 215.

$$VDD=VG \times (1+R1/R2)$$

The relationship between the value of the phase compensation capacitor connected to the phase compensation terminal CIN and the characteristics of the power supply circuit 220 will be further described. The value of the phase compensation capacitor connected to the phase compensation terminal CIN decides the cutoff frequency (a frequency at which the gain decreases by 6 db from the DC gain) of the gain-frequency characteristic of the voltage supply circuit 222 including the differential amplifier circuit 212. As the value of the phase compensation capacitor increases, the cutoff frequency decreases, and the gain decreases at a high frequency. This decrease in gain occurs when an output impedance increases at a frequency higher than the cutoff frequency, that is, a high impedance state is set on the high-frequency side. Along with this decrease in gain, the random noise generated by the reference voltage generation circuit 211 or the differential amplifier circuit 212 decreases. In contrast to this, as the value of the phase compensation capacitor increases, the responsiveness of current fluctuations deteriorates.

That is, in the third embodiment, the value of the phase compensation capacitor connected to the phase compensation terminal CIN in a period during which noise should be suppressed (that is, a period during which the control signal PSC is at active level) is set to be larger than that in other periods. This reduces random noise generated by the reference voltage generation circuit 211 or the differential amplifier circuit 212, and suppresses noise to be written in memory devices CN and CS of memories 40A and 40B. On the other hand, the value of the phase compensation capacitor connected to the phase compensation terminal CIN is set to be small in periods other than a period during which noise should be suppressed. This increases the gain at a high frequency in the voltage supply circuit 222 including the differential amplifier circuit 212, thereby enabling a high-speed operation. This makes it possible to follow fluctuations in current flowing into a power supply pin VDDP of the image sensor 100 more quickly, thereby reducing fluctuations in the power supply voltage VDD.

The above embodiments provide a technique advantageous in reducing the influence of noise generated by the power supply circuit.

Figure 8:
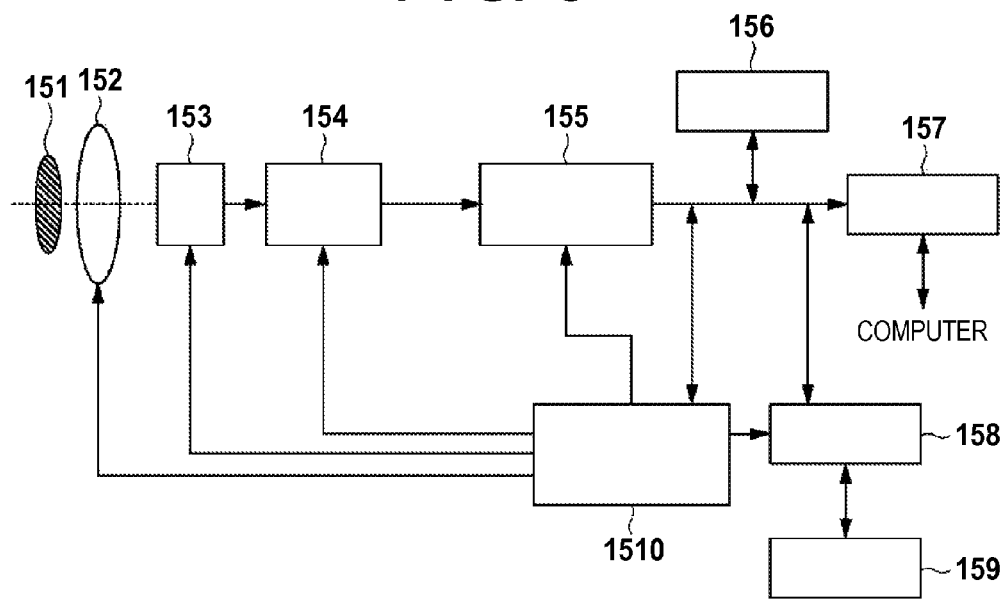
FIG. 8 is a block diagram showing the arrangement of a camera according to the fourth embodiment of the present invention.

FIG. 8 exemplarily shows a camera 1000 incorporating an image sensing device 154 represented by the first to third embodiments. The concept of the camera includes not only an apparatus mainly designed to perform image sensing but also an apparatus including an image sensing function as an auxiliary function (for example, a personal computer or a portable terminal).

The camera 1000 includes a barrier 151 for protecting a lens, a lens 152 which forms an optical image of an object on an image sensing plane of an image sensor in the image sensing device 154, and a stop 153 for variably changing the amount of light passing through the lens 152. The camera 1000 further includes an output signal processing unit 155 which processes a signal output from the image sensing device 154. The signal output from the image sensing device 154 is a sensed signal for generating an image obtained by sensing an object. The output signal processing unit 155 generates an image by performing various types of correction and compression of the sensed signal output from the image sensing device 154 as needed. The lens 152 and the stop 153 constitute an optical system which focuses light onto the image sensing device 154.

The camera 1000 includes a buffer memory unit 156 for temporarily storing image data and an external interface unit 157 for communication with an external computer or the like. The camera 1000 further includes a detachable recording medium 159 such as a semiconductor memory for recording or reading out sensed image data and a recording medium control interface unit 158 for recording or reading out with respect to the recording medium 159. The camera 1000 also includes an overall control/computation unit 1510 which controls various types of computation and the overall digital still camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-217861, filed Oct. 18, 2013 which is hereby incorporated by reference herein in its entirety.

What is claimed is:

1. An image sensor comprising a semiconductor chip and a package covering the semiconductor chip, the semiconductor chip comprising a pixel portion including a plurality of pixels arranged to form a plurality of rows and a plurality of rows, a row selection unit configured to select a row of the plurality of columns, a memory, a readout unit configured to write, in the memory, a first signal corresponding to a reset level from pixels of the row selected from the plurality of rows by the row selection unit and a second signal corresponding to an optical signal level from the pixels of the row selected from the plurality of rows, an output unit configured to output an image signal corresponding to the first and second signals written in the memory, a control unit configured to output a control signal to an output pin of the package via an output pad of the semiconductor chip, and a pad to which a power supply voltage is supplied from outside the semiconductor chip, wherein the control signal indicates a write period within a row-selected period during which the row is selected from the plurality of rows by the row selection unit, and wherein during the write period, the first and second signals associated with the row selected from the plurality of rows are written in the memory.

2. The sensor according to claim 1, wherein the memory includes a first memory device to which the first signal is written, and a second memory device.

3. The sensor according to claim 1, wherein in the row-selected period, the control signal changes from a first level to a second level at a start of the write period, keeps the second level during the write period, and changes from the second level to the first level at an end of the write period.

4. An image sensing device comprising an image sensor, a power supply circuit configured to supply, from a power supply terminal and a ground terminal thereof, a power supply voltage to the image sensor via a power supply line and a ground line, and a power supply voltage holding unit configured to hold the power supply voltage, the image sensor including a control unit configured to control an impedance between the power supply terminal and the ground terminal of the power supply circuit, a pixel portion including a plurality of pixels arranged to form a plurality of rows and a plurality of columns, a row selection unit configured to select a row of the plurality of rows, a memory, and a readout unit configured to write, in the memory, a first signal corresponding to a reset level from pixels of the row selected from the plurality of rows by the row selection unit, a second signal corresponding to an optical signal level from the pixels of the row selected from the plurality of rows, wherein the control unit is configured to output a control signal to control the impedance between the power supply terminal and the ground terminal of the power supply circuit, wherein the control signal indicates a write period within a row-selected period during which the row is selected from the plurality of rows by the row selection unit, wherein during the write period, the first and second signals associated with the row selected from the plurality of rows are written in the memory, and wherein in the write period during which the first and second signals are written in the memory, the control unit controls the control signal such that a high impedance state is set between the power supply terminal and the ground terminal of the power supply circuit, and the power supply voltage holding unit supplies the power supply voltage to the image sensor.

5. The device according to claim 4, wherein the memory includes a first memory device to which the first signal is written, and a second memory device.

6. The device according to claim 4, wherein the power supply voltage holding unit is a capacitor connected between the power supply line and the ground line.

7. The device according to claim 4, wherein the power supply circuit comprises a voltage supply circuit configured to supply the power supply voltage and a phase compensation unit, the voltage supply circuit comprising a differential amplifier circuit including a phase compensation terminal, and the phase compensation unit comprising a phase compensation capacitor connected to the phase compensation terminal, and the phase compensation unit increases a value of the phase compensation capacitor in a period during which the readout unit writes a signal corresponding to a signal from the pixel portion in the memory.

8. The sensing device according to claim 4, wherein in the row-selected period, the control signal changes from a first level to a second level at a start of the write period, keeps the second level during the write period, and changes from the second level to the first level at an end of the write period.

9. An image sensing device comprising an image sensor, a power supply circuit configured to supply a power supply voltage to the image sensor via a power supply line and a ground line, and a power supply voltage holding unit configured to hold the power supply voltage, a switch arranged between the power supply circuit and the power supply line, and a control unit configured to control the switch, the image sensor including a pixel portion including a plurality of pixels arranged to form a plurality of rows and a plurality of columns, a row selection unit configured to select a row of the plurality of rows, a memory, a readout unit configured to write, in the memory, a first signal corresponding to a reset level from pixels of the row selected from the plurality of rows by the row selection unit, and a second signal corresponding to an optical signal level from the pixels of the row selected from the plurality of rows, and a control unit configured to output a control signal to control the switch, wherein the control signal indicates a write period within a row-selected period during which the row is selected from the plurality of rows by the row selection unit, wherein during the write period, the first and second signals associated with the row selected from the plurality of rows are written in the memory, and wherein in the write period during the first and second signals are written in the memory, the control unit controls the control signal such that the switch is set in an OFF state, and the power supply voltage holding unit supplies the power supply voltage to the image sensor.

10. A camera comprising:
an image sensing device defined in claim 4; and
a signal processing unit configured to process an image signal output from the image sensor of the image sensing device.

11. A method of driving an image sensing device including an image sensor, a power supply circuit configured to supply, from a power supply terminal and a ground terminal thereof, a power supply voltage to the image sensor via a power supply line and a ground line, and a power supply voltage holding unit configured to hold the power supply voltage, the image sensor including a pixel portion including a plurality of pixels arranged to form a plurality of rows and a plurality of columns, a row selection unit configured to select a row of the plurality of rows, a memory, a readout unit configured to write, in the memory, a first signal corresponding to a reset level from arranged to form a plurality of rows and a plurality of columns, a row selection unit configured to select a row of the plurality of rows and a second signal corresponding to an optical signal level from the pixels of the row selected from the plurality of rows, an output unit configured to output an image signal corresponding to the first and second signals written in the memory, and a control unit configured to output a control signal, wherein the control signal indicates a write period within a row-selected period during which the row is selected from the plurality of rows by the row selection unit, wherein during the write period, the first and second signals associated with the row selected from the plurality of rows are written in the memory, and wherein in write period during which the readout unit writes the first and second signals in the memory, a high impedance state is set between the power supply terminal and the ground terminal of the power supply circuit, and the power supply voltage holding unit supplies the power supply voltage to the image sensor.

* * * * *